April 25, 1939.   H. DOYLE   2,156,012
INDICATING INSTRUMENT FOR AIRCRAFT
Filed May 25, 1935.   2 Sheets-Sheet 1
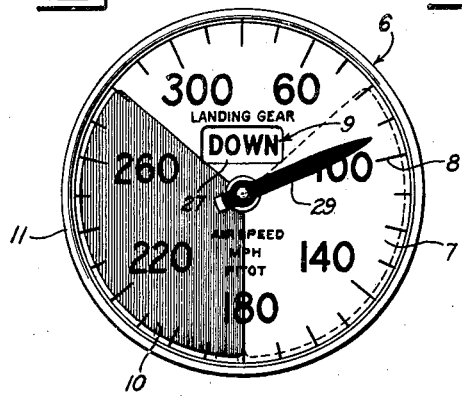
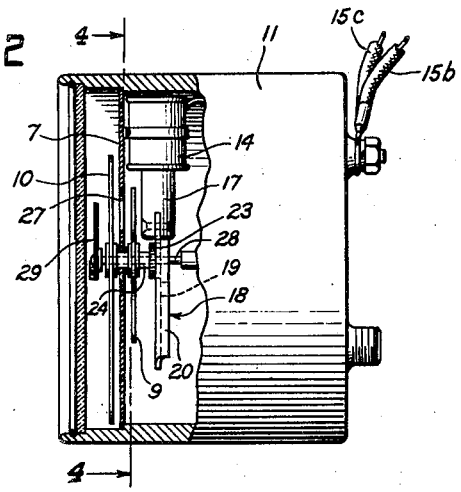
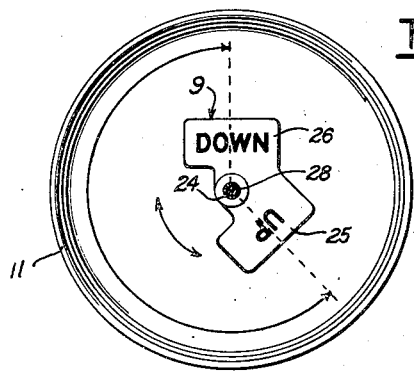
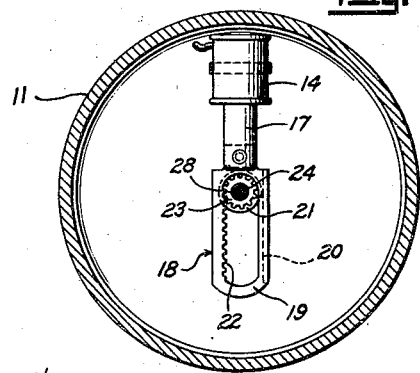
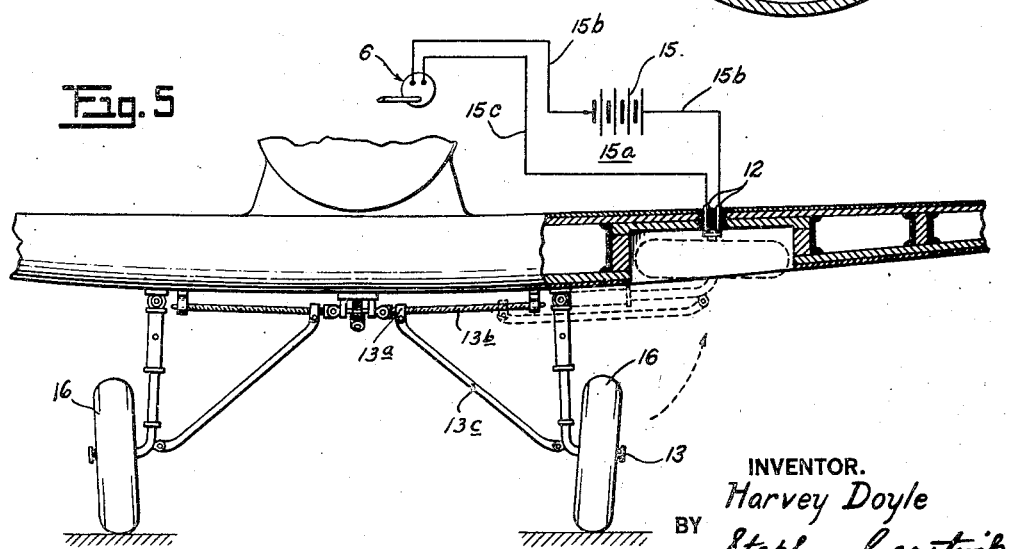
INVENTOR.
Harvey Doyle
BY Stephen Gerstvik
ATTORNEY.

April 25, 1939.　　　　　H. DOYLE　　　　　2,156,012
INDICATING INSTRUMENT FOR AIRCRAFT
Filed May 25, 1935　　　　2 Sheets-Sheet 2
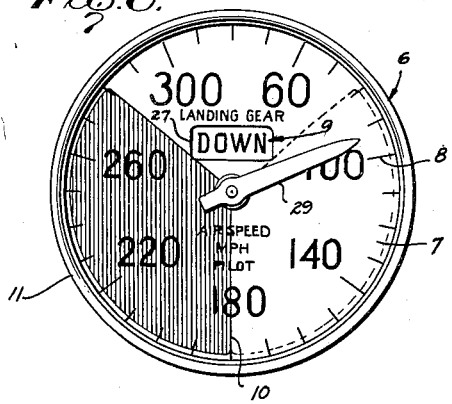
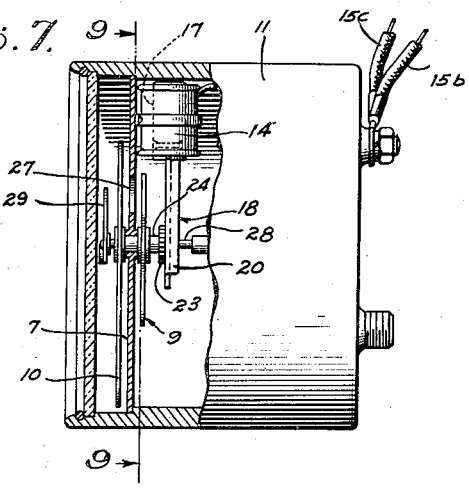
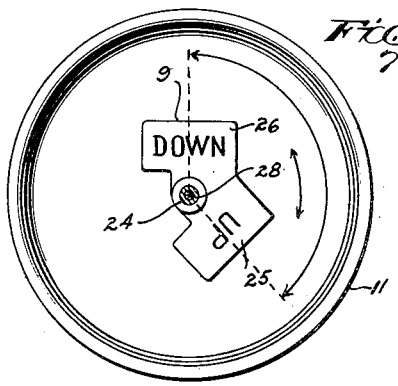
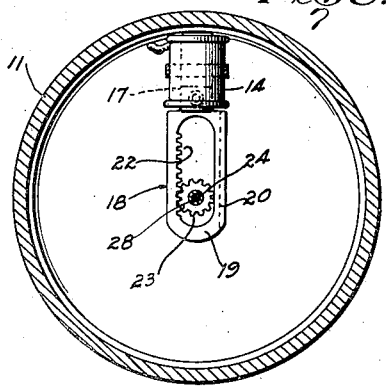
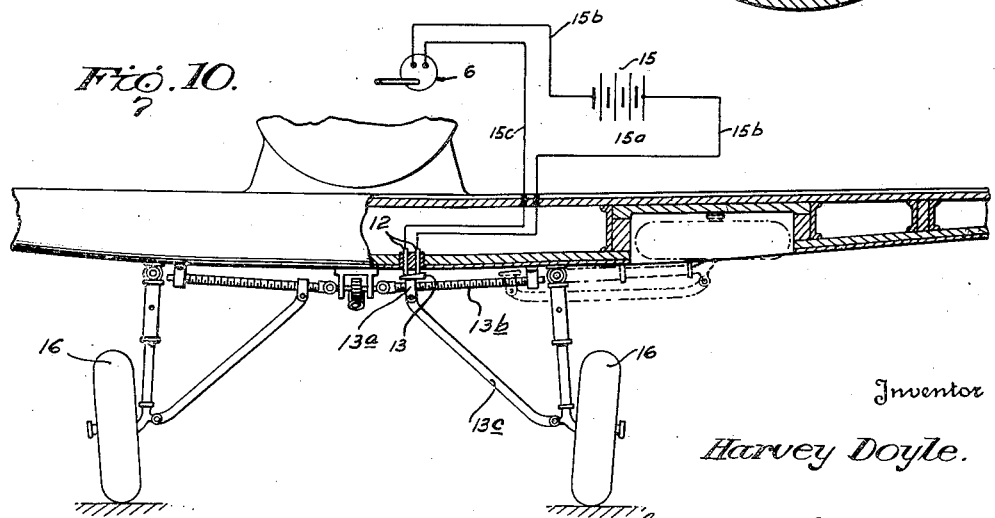
Inventor
Harvey Doyle.
By Stephen Cerstvik.
Attorney Patented Apr. 25, 1939

2,156,012

UNITED STATES PATENT OFFICE 2,156,012

INDICATING INSTRUMENT FOR AIRCRAFT

Harvey Doyle, Lutherville, Md., assignor to Pioneer Instrument Company, Inc., Brooklyn, N. Y., a corporation of New York Application May 25, 1935, Serial No. 23,504

4 Claims. (Cl. 177—311)

The present invention relates to indicating instruments, and more particularly to indicating instruments for use on aircraft equipped with retractible landing gear.

One of the objects of the invention is to provide novel indicating means for use in aircraft having retractible landing gear whereby a warning will be given to the pilot of the aircraft as to the position of the retractible landing gear in order that said gear is not inadvertently left in a wrong position.

Another object is to provide novel means whereby such warning is given by a visual signal on the instrument board to which the pilot's attention is constantly directed, said novel means thus being effective to keep the pilot's attention to the board, rather than detract it therefrom.

Another object is to provide an air speed indicator having novel means whereby the pilot's attention is fixed to that range of speeds on the scale of the air speed indicator, which is most important under the particular circumstances of the flight as, for example, in take off and landing.

Still another object is to provide a novel signal device for warning a pilot whether the retractible landing gear of his aircraft is in an "up" or "down" position, and particularly an electrically operated indicating device which is not energized and actuated to indicate a "down" position of the landing gear until the latter is in its fully extended "down" position, thereby insuring the pilot that he may safely land his aircraft.

A still further object of the invention is to provide in an aircraft having retractible landing gear, a novel combination including contact means controlled by the landing gear, an air speed indicator, a landing gear position indicator, and a dial-obscuring shield, both of the latter being incorporated in the casing of the air speed indicator and actuated upon operation of said contact means.

The above and other objects and advantages of the invention will appear more fully hereinafter from a consideration of the detailed description which follows, taken together with the accompanying drawing wherein one embodiment of the invention is illustrated. It is to be expressly understood, however, that the drawings are for the purpose of illustration and description only and are not intended as a definition of the limits of the invention, reference being had for this purpose to the appended claims.

In the drawings, wherein like reference characters refer to like parts throughout the several views, Fig. 1 is a front view of an air speed indicator embodying the invention, showing all signals as same might appear to a pilot;

Fig. 2 is a vertical partly sectional view of the air speed indicator of Fig. 1, showing only that part of the structure which embodies the invention;

Fig. 3 shows the manner in which the landing gear position indicator is mounted in the casing of the air speed indicator, other details of the air speed indicator mechanism being removed for the sake of clearness;

Fig. 4 taken on line 4—4 of Fig. 2 is a front view of the actuating solenoid with guide assembly attached, showing its position in the air speed indicator casing, element 9 being omitted for clarity;

Fig. 5 is a partial front view of an aircraft having a retractible landing gear, with parts of its wings removed in order to show the controlling electric contact means; and Figs. 6 to 10, inclusive, illustrate another embodiment of the invention and are views respectively similar to the views shown in Figs. 1 to 5, inclusive.

Referring first to Figs. 1 to 5 of the drawings, which illustrate one embodiment of the invention, the novel indicating apparatus embodying the invention comprises an air speed indicator 6 having a dial 7 provided with a scale 8, a landing gear position indicator 9, a scale-obscuring shield 10, said indicator 9 and shield 10 being incorporated in the casing 11 of the air speed indicator, and electric contact means carried by the aircraft (Fig. 5) and including contacts 12, contact disk 13, a solenoid 14 and a source 15, said contact means being adapted to be actuated by the landing gear of the aircraft (Fig. 5).

Referring now more particularly to Fig. 5, the electric contact means consist of an electric circuit 15a including the source of electric current 15, connecting leads 15b and 15c, contacts 12, and solenoid 14, said solenoid being incorporated in the casing 6 of the air speed indicator, as shown in Fig. 4. The contacts 12 are installed at some suitable place in the aircraft, and are adapted to be closed by some part of the retractible landing gear when same is in its retracted position. In the present embodiment, the contacts 12 are installed in the aircraft wing at a point where they can be closed by the contact disk 13 which is attached to the hub of the landing wheel 16, when said wheel is moved into its retracted position, as indicated by the dotted lines in Fig. 5. It is, of course, possible to install said contact means in various other places of the aircraft where similar cooperation thereof with the landing gear may be accomplished.

The solenoid 14 is mounted in the air speed indicator casing 11 of indicator 6 (see Fig. 2), and is provided with a moving core or plunger 17 having a guide assembly 18 attached to it in any suitable manner, said guide assembly being adapted to be raised by the solenoid 14 when the contacts 12 are closed. The guide assembly 18 is in the form of a U-shaped guide member 19 (see Fig. 4), having an internal channel or tract 20 on one of its legs and cooperating with a roller 21. A rack 22 is formed on the other leg of the U-shaped member, which rack cooperates with a pinion 23 to actuate the same when the plunger is drawn into the solenoid 14. The pinion 23 is mounted on a sleeve 24 which carries the indicating plate 9 and the semi-transparent shield 10. Said plate 9 has two indicating portions 25 and 26 having thereon the inscription "up" and "down", respectively, as shown on Fig. 3, which are adapted to be moved alternately opposite an opening 27 of the dial 7 of the air speed indicator 6. Plate 9 is so mounted on the sleeve 24 that when the guide assembly 18 is raised by the solenoid 14, the "up" indicating portion shows in the opening or window 27 and when the solenoid is de-energized, the "down" portion shows through the window 27. The semi-transparent shield 10 is mounted on the sleeve 24 in front of the dial 7 and rotates together with the indicator 9. The shield 10 is so mounted that when indicator 9 is in its "up" position, said shield covers the low-speed portion of the scale 8 on the dial 7; and when indicator 9 is in its "down" position, said shield 10 covers the high-speed portion of said scale. This shield may be made in a variety of forms, preferably in the form of a sector in order not to obscure the opening 27. A shaft 28 extends through the sleeve 24 and carries a pointer 29 which is secured to that portion of the shaft which protrudes out of said sleeve 24, said shaft 28 being rotatable independently of the sleeve 24 by the air speed mechanism (not shown).

Air speed is usually very carefully checked by the pilot during climb and after take off, in cruising, and during the glide when landing. During the take off and in landing, the landing gear of the aircraft is in its extended position. In this case the contacts 12 are open whereby the solenoid 14 is de-energized and the core 17 of the solenoid is in its down position, and, consequently, the "down" portion 26 of the indicator 9 is visible in the opening 27. At the same time the high-speed portion of the scale 8 of the dial 7 is obscured by the shield 10. When higher speeds are attained and the landing gear is retracted, the contact disk 13 closes the contacts 12 whereby solenoid 14 is energized from the source 15 and the guide assembly 18 is raised, thus causing the rack 22 to actuate the gear 23 whereby the indicator 9 is moved into its "up" position. The shield 10 is also moved and functions to obscure the low speed portion of the scale 8 of dial 7, which portion does not need attention at the higher speeds.

When the speed of the aircraft is reduced, as when it is desired to land, and the landing gear is extended, the contacts 12 are opened whereby the solenoid 14 is de-energized and the indicator 9 and the shield 10 are returned to their respective down positions by gravity.

Referring now to Figs. 6 to 10, inclusive, there is shown another embodiment of the invention, wherein the indicating flag 9 is actuated into the "down" position when the solenoid 14 is energized and returns to the "up" position by gravity. This arrangement insures the pilot that the landing gear is in its fully extended "down" position when the indicator shows "down" and, hence, prevents attempted landings without the gear being in fully extended position. For this purpose, the contact 13, instead of being carried on the hub of the wheel 16, is carried by a threaded member 13a which cooperates with the threaded operating shaft 13b to move the pivoted arm 13c outwardly and inwardly and, hence, to retract and extend the wheel 16 of the landing gear. The contacts 12 are then located in a position adjacent the driven end of the threaded shaft 13b so that the contact 13 does not close the contacts 12 until the threaded member 13a is in the extreme left position, as viewed in Fig. 10, and the wheels 16 are in the fully extended down position, whereupon the circuit 15a is closed and solenoid 14 (see Fig. 9) becomes energized and pulls plunger 17 thereinto to operate rack 22 and pinion 23 as shown in Figs. 7 and 9. The "down" portion of the indicator 9 is then moved into its indicating position so as to be visible through the window 27. In this embodiment, the flag 9 rotates clockwise upon energization of the solenoid 14 as in Figs. 1 to 5, thereby causing the flag 9 and the shield 10 to revolve through approximately only 130 degrees instead of 230 degrees from one position to another. The reason that only 130 degrees rotation is needed is due to the fact that in this embodiment the indicator 9 indicates "down" when the solenoid is in its "up" or "energized" position, or in other words, the reverse of Figs. 3 and 4.

Also during cruising, no current is consumed from the battery 15 because the circuit 15a is open at that time and is closed only when the pilot is going to land his craft and after he lands, he can open the circuit by a suitable hand switch (not shown).

From the foregoing it will be apparent that there are thus provided novel means whereby a visual signal is always given to the pilot of an aircraft as to the position of the retractible landing gear carried by the aircraft and whereby the pilot's attention is fixed to the narrowed space of the air speed indicator scale requiring special attention under the changing conditions of speed.

Although only two embodiments of the invention have been illustrated and described, other changes and modifications in the form and relative arrangement of parts, which will appear to those skilled in the art, may be made without departing from the scope of the invention. Reference is, therefore, to be had to the appended claims for a definition of the limits of the invention.

What is claimed is:

1. The combination with an aircraft having retractible landing gear, of an air speed indicator having a dial provided with a scale, a semi-transparent shield for alternately obscuring the low-speed and the high-speed portions of said scale, and means actuated by said landing gear for operating said semi-transparent shield.

2. In an air speed indicator for aircraft having retractible landing gear, an indicator including a scale for indicating air speed over the operating range of the instrument, means cooperating with said scale and control means therefor whereby said cooperating means are actuated in accordance with the position of the landing gear for emphasizing one portion of said scale when the landing gear is in extended position and another portion when the landing gear is in the retracted position.

3. In an air speed indicator for aircraft having retractible landing gear, an indicator including a scale for indicating air speed over the operating range of the instrument, means cooperating with said scale and means connecting said cooperating means to said landing gear whereby said cooperating means are actuated in accordance with the position of the landing gear for emphasizing the lower range of the scale when the landing gear is in extended position and the upper range when the landing gear is in retracted position.

4. In an air speed indicator for aircraft having retractible landing gear, an indicator including a scale for indicating air speed over the operating range of the instrument, means cooperating with said scale for rendering the upper range of the scale less visible when the landing gear is in extended position and the lower range of said scale less visible when the landing gear is in retracted position and means actuating said cooperating means in accordance with the position of said landing gear.

HARVEY DOYLE.